United States Patent [19]

Hansen et al.

[11] 4,310,917

[45] Jan. 12, 1982

[54] PICK-UP

[75] Inventors: Bjarne S. Hansen, Fredensborg; Knud H. Andersen, Holte; Robert Gudmandsen, Taastrup, all of Denmark

[73] Assignee: Ortofon Manufacturing A/S, Valby, Denmark

[21] Appl. No.: 14,992

[22] Filed: Feb. 26, 1979

[30] Foreign Application Priority Data

Feb. 28, 1978 [DK] Denmark ............................ 904/78

[51] Int. Cl.[3] ............................................ G11B 3/20

[52] U.S. Cl. ............................................ 369/170

[58] Field of Search ................ 274/37; 179/100.41 D, 179/100.41 K, 100.41 M, 100.41 Z; 369/170

[56] References Cited

U.S. PATENT DOCUMENTS

| | | | |
|---|---|---|---|
| 3,909,008 | 9/1975 | Sakai | 274/37 |
| 3,991,284 | 11/1976 | Braun | 274/37 |
| 4,138,122 | 2/1979 | Nakatsuka | 274/37 |
| 4,194,744 | 3/1980 | Groh et al. | 274/37 |

OTHER PUBLICATIONS

"Dynamic Vib. Absorber Principle Applied to a High Quality Phono Pickup" *Journal of Audio Eng.*, 6/1977 vol. 25 #6 pp. 385–390.

*Primary Examiner*—Charles E. Phillips
*Attorney, Agent, or Firm*—Fleit & Jacobson

[57] ABSTRACT

In a pick-up of the type having a relatively flat, square armature disposed perpendicularly to one end of a stylus arm and supported on one side by an elastic damping device which in turn is firmly supported by an air gap defining pole piece, selective damping is provided by the application of a particular damping device consisting of a disc shaped inertia body clamped between two rubber pads.

6 Claims, 1 Drawing Figure

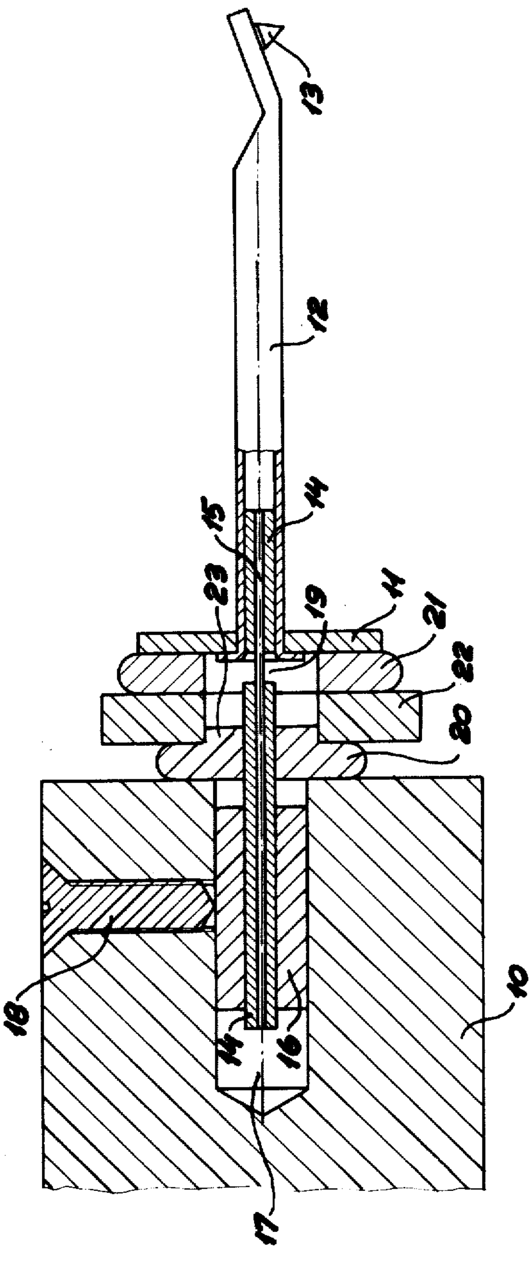
13
12
14
15
23
19
11
21
22
20
18
10
14
16
17

PICK-UP

The invention relates to a pick-up of the type comprising an armature disposed perpendicularly to the end of a stylus arm and abutting on one side of a damper device which is firmly supported on the other side. In a known pick-up of this type the damping device is a rubber pad against which the armature is clamped by a nickel-plated piano wire whose one end enters into and is secured in an axial central bore in the end of a pole leg, and whose other end is attached in the end of the tubular stylus arm. The nickel-plating is removed on a short section immediately behind the armature, and this section constitutes the pivot of the armature about which it may swing in all directions when the stylus moves in a stereo audio track. Thus, the rubber pad serves both as a bearing element and as a return spring determining the neutral position of the stylus arm and the armature and exerting at the same time a vibration damping effect on the moving system. To obtain a good damping and channel separation the rubber pad must be rather stiff and consequently it must preferably consist of a hard rubber having a high modulus of elasticity. The great stiffness required of the bearing element limits the stylus elasticity and trackability of the pick-up.

The Danish Published Application No. 137 560 teaches to supplement the moving system of the pick-up by one or more fixedly supported rubber parts abutting on the moving parts at a greater distance from their pivot and with a smaller pressure than the elastic bearing element. In this arrangement the damping function is partly separated from the bearing function, permitting each of these functions to be improved without this being done at the expense of the other.

An article entitled "The Dynamic Vibration Absorber Principle Applied to a High-Quality Phonograph Pickup" by Allen R. Groh in Journal of the Audio Engineering Society, June 1977, teaches to selectively damp the moving system of a magnetic pick-up by means of a so-called dynamic vibration absorber. Said dynamic vibration absorber is mounted on the rear end of the armature in the form of a rod magnet located in continuation of the stylus arm, and consists of an inertial mass connected to the armature end through an elastic body. Such as dynamic damper has various damping properties below, near and above its natural resonance frequency. The characteristic of the pick-up may therefore be changed in a specific, desired frequency range by suitable dimensioning, permitting the use of a comparatively soft bearing element and thus the achievement of good stylus compliance and trackability.

The object of the invention is to provide a dynamic vibration damper suitable for use in a pick-up of the subject type, and this purpose is achieved in that the damping device consists of at least two elastic pads between which at least one inertial body is located. The only amendment required of the conventional construction is the insertion of an inertial body and an additional elastic pad between the armature and the usual bearing pad. Both bearing pads may consist of comparatively soft material having good damping properties, for example butyl rubber. At frequencies considerably below the resonance frequency of the vibration damper consisting of the elastic pads and the inertial body or bodies, said damper will behave substantially as a continuous comparatively soft rubber pad whose mass has no noticeable influence on the performance of the pick-up, and which gives a good stylus compliance and trackability. At frequencies considerably above the natural resonance frequency the inertial body or bodies will remain substantially stationary so that the vibration damper functions as if the outermost elastic pad were the only damping element, resulting in an increase of the effective stiffness. The inertial body or bodies may for example consist of platinum with a specific weight of 21.4. Thanks to the manner in which the moving system is mounted in said conventional pick-up having a flat armature, no special attachment means to the inertial body or bodies and to the additional elastic pad are required since these parts are firmly clamped by the tension of the piano wire.

A particularly expedient embodiment of the pick-up is characterized in that the inertial body is an annular disc. The inertial body will be safely centred with respect to the axis of the moving system by providing the innermost elastic pad with an central projection extending into and fitting in the central hole in the inertial body.

The invention will be explained more fully below with reference to the drawing showing a vertical longitudinal section of an embodiment of the pick-up according to the invention and illustrating the moving system and the parts carrying them.

In the drawing 10 is the end portion of a cylindrical pole leg guiding the magnetic flux from a permanent magnet (not shown) to the air gap between the pole leg and a yoke (not shown) located opposite the pole leg, said yoke guiding the flux back to the magnet. In the air gap there is positioned a flat, substantially square armature 11 that may consist of a magnetically conductive or magnetically non-conductive material and is provided with windings (not shown). The armature is secured on the rear end of a tubular stylus arm 12 extending through a central hole in the armature and carrying a stylus 13 at its front end. The rear end of the stylus arm 12 mounts one end of a piano wire 15 coated with a nickel-plating, and the other end of said wire is secured in a sleeve 16 which in turn is attached in an axial central bore 17 in the end of the pole leg 10 by means of a screw which is screwed into a radial, threaded bore in the pole leg. The nickel-plating 14 is removed on a short section immediately adjacent the armature as shown at 19. A bearing device is mounted between the pole leg 10 and the armature 11 and consists of two annular pads 20 and 21 of butyl rubber and an intermediate disc-shaped inertial body 22 of platinum. All three discs have a central bore for the nickel-plated piano wire, and the central hole in the platinum disc 22 and the outermost rubber disc 21 have a diameter considerably larger than the nickel-plating 14 of the wire. The innermost rubber disc 20 is formed with an axial central projection 23 fitting into the central hole in the platinum disc 22 and thus keeping it centred.

The elastic pads may consist of a material other than butyl rubber and may be divided into several discs having different properties. The inertial body may also comprise a material other than platinum, for example tin, and it may also be composed of or divided into several parts that may be separated from each other by elastic pads. The details of the shown and described construction may also be changed in other ways. The various parts of the damping and bearing device of the moving system may for example be glued to each other and to the armature and the pole leg instead of being clamped to these latter parts by the tension in a piano wire, which means that this wire may be omitted.

We claim:

1. A pickup comprising:

a supporting structure, a stylus arm, a relatively flat armature defining a plane disposed perpendicularly to said stylus arm at one end thereof, and a combined bearing and damping device comprising at least two elastic pads and at least one inertial body located therebetween, one of said at least two elastic pads having a substantially parallel side face parallel to said plane, and thus perpendicular to said stylus arm, and abutting on said supporting structure, and another of said at least two elastic pads having a substantially parallel side face parallel to said plane, and thus perpendicular to said stylus arm, and abuttting on said armature, further comprising support means passing through the center of said stylus arm and through said at least two elastic pads of said combined bearing and damping device, and anchored in said supporting structure, for supporting said stylus arm and said at least two elastic pads of said combined bearing and damping device.

2. A pick-up according to claim 1, wherein the inertial body comprises a disc having a central hole.

3. A pick-up according to claim 2, wherein the elastic pad abutting on said supporting structure has a central projection extending into the central hole of the disc comprising the inertial body.

4. A pick-up according to claim 1, wherein said relatively flat armature defines a plane, said stylus arm being perpendicular to said plane, said substantially parallel side faces of said combined damping and bearing device being parallel to said plane.

5. A pick-up according to claim 1, wherein said support means comprises a wire which is partially nickleplated.

6. A pick-up according to claim 1, wherein said support means comprises a wire.

* * * * *